United States Patent [19]
Cruise et al.

[11] Patent Number: 5,816,606
[45] Date of Patent: Oct. 6, 1998

[54] HORIZONTALLY-MOUNTED REAR SHOCK ABSORBER FOR LIGHTWEIGHT MOTOR VEHICLE

[75] Inventors: Phillip D. Cruise, Royal Oak; James C. Rich, White Lake, both of Mich.

[73] Assignee: Chrysler Corporation, Auburn Hills, Mich.

[21] Appl. No.: 539,257

[22] Filed: Oct. 5, 1995

[51] Int. Cl.⁶ .......................... B60G 11/23; B60G 11/62
[52] U.S. Cl. .......................... 280/717; 280/700; 280/721
[58] Field of Search .................... 280/717, 721, 280/723, 705, 700, 702, 709, 724; 267/279

[56] References Cited

U.S. PATENT DOCUMENTS

| | | | |
|---|---|---|---|
| 2,148,029 | 2/1939 | Matthews | 267/57 |
| 2,226,406 | 12/1940 | Krotz | 267/21 |
| 2,260,634 | 10/1941 | Mullner | 280/724 |
| 2,286,609 | 6/1942 | Ledwinka | 267/21 |
| 2,409,500 | 10/1946 | Krotz | 267/21 |
| 2,450,506 | 10/1948 | Flogaus | 267/21 |
| 2,804,732 | 9/1957 | Brockley | 51/205 |
| 2,815,961 | 12/1957 | Brueder | 280/725 |
| 3,006,627 | 10/1961 | Paulsen | 267/57.1 |
| 3,331,627 | 7/1967 | Schroder et al. | 296/31 |
| 3,371,940 | 3/1968 | Sinclair et al. | 280/705 |
| 3,402,940 | 9/1968 | Castelet | 280/723 |
| 3,436,069 | 4/1969 | Henschen | 280/717 |
| 3,545,737 | 12/1970 | Lamprey | 267/279 |
| 3,779,576 | 12/1973 | Malcolm | 280/717 |
| 4,043,417 | 8/1977 | Orpana | 280/717 |
| 4,473,238 | 9/1984 | Antoine | 280/721 |
| 4,580,808 | 4/1986 | Smith-Williams | 280/700 |
| 4,625,995 | 12/1986 | Aubry et al. | 280/723 |
| 4,695,073 | 9/1987 | Pettibone et al. | 280/661 |
| 4,707,020 | 11/1987 | Enokida et al. | 296/191 |
| 4,830,396 | 5/1989 | Gandiglio | 280/724 |
| 5,009,463 | 4/1991 | Saitoh et al. | 296/901 |
| 5,080,389 | 1/1992 | Kawano et al. | 280/667 |
| 5,411,285 | 5/1995 | Lee | 280/701 |

FOREIGN PATENT DOCUMENTS

| | | |
|---|---|---|
| 628328 | 8/1949 | United Kingdom . |
| 628330 | 8/1949 | United Kingdom . |
| 1237615 | 6/1971 | United Kingdom . |
| 2146407 | 4/1985 | United Kingdom . |
| 2207975 | 2/1989 | United Kingdom . |

*Primary Examiner*—Paul N. Dickson

[57] ABSTRACT

An automobile includes a plastic body and a steel frame bonded to the plastic body. The rear suspension system of the automobile includes a suspension arm coupled to a rear wheel. An arm shaft extends transversely inwardly from the arm and is embedded in a rubber cartridge press-fit into the frame, to thereby attenuate motion of the suspension arm. A horizontally-mounted longitudinally-oriented shock absorber further interconnects the suspension arm and frame. This shock absorber orientation avoids transferring suspension system loads to the plastic body.

4 Claims, 2 Drawing Sheets

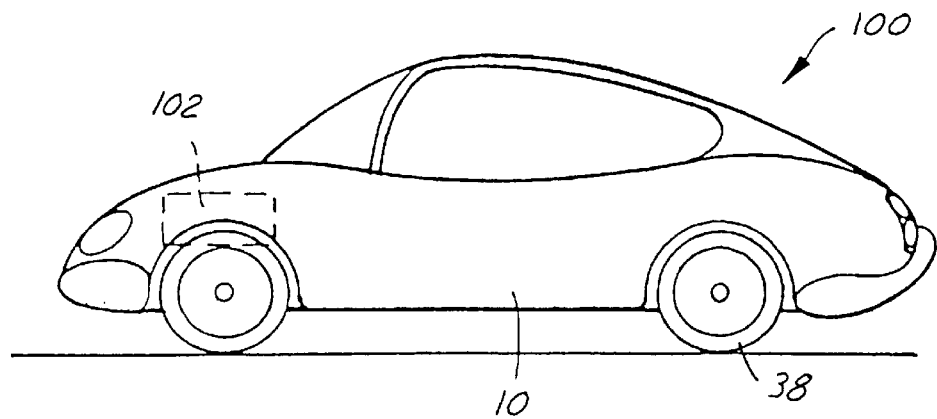
FIG. 1
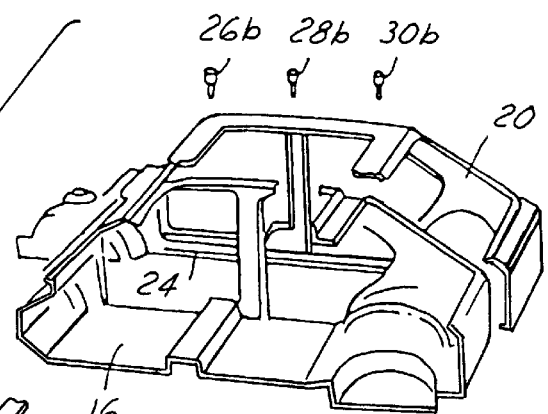
FIG. 2
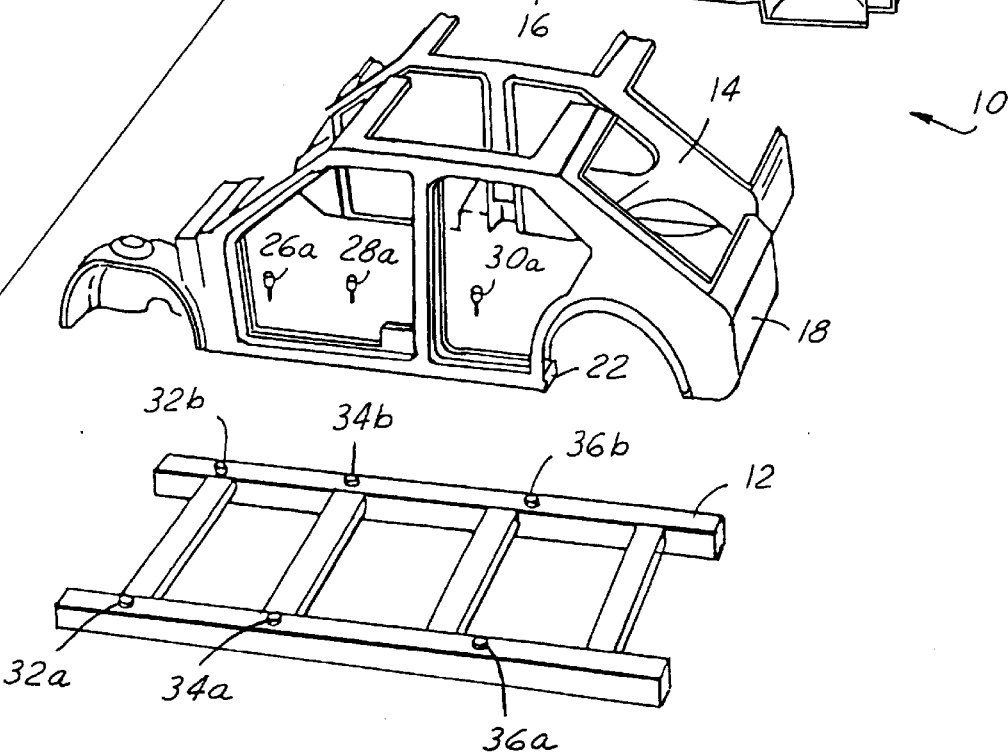

HORIZONTALLY-MOUNTED REAR SHOCK ABSORBER FOR LIGHTWEIGHT MOTOR VEHICLE

CROSS-REFERENCE TO RELATED APPLICATIONS

This application is related to U.S. patent application Ser. Nos. 08/540,297 now abandoned, 08/549,899 abandoned, 08/540,373 abandoned, 08/549,244 and 08/549,413 abandoned.

FIELD OF INVENTION

The present invention relates generally to vehicle suspension systems, and more particularly to suspension systems for lightweight motor vehicles.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of, which can be minimized by minimizing the weight of the automobile and by using the novel structure disclosed herein.

More specifically, the present invention recognizes that a useful, low-cost, lightweight automobile can be provided which has a molded plastic body consisting essentially of a unitarily molded left half side bonded to a unitarily molded right half side.

It will readily be appreciated that a molded plastic body is both lightweight, compared to metal automobile bodies, and inexpensive, compared to, e.g., fiberglass automobile bodies.

As further recognized by the present invention, by making an automobile body of lightweight molded plastic, weight bearing components such as suspension springs can be simplified vis-a-vis weight bearing components of heavier steel-bodies automobiles. Consequently, the overall cost of the lightweight automobile can be even further reduced relative to heavier automobiles.

It happens, however, that the present invention still further recognizes that in making an automobile body of plastic, additional changes beyond simplification must be made to the automobile suspension system relative to existing suspension systems. For instance, in existing automobile suspension systems, elongated shock absorbers are mounted vertically between the suspension springs and the body of the automobile, with the body thus providing load support for the shock absorbers. The present invention recognizes that plastic automobile bodies unfortunately cannot easily provide sufficient load support for shock absorbers.

Indeed, as recognized herein the load of the shock absorbers on the plastic body, were the shock absorbers to be connected directly to the body, could crack and otherwise damage the body. Simply reinforcing the plastic body to support the shock absorber load would tend to undesirably increase the cost of the automobile and would not necessarily be effective in preventing body damage over prolonged automobile use. Accordingly, it is one intent of the present invention to support suspension system shock absorbers with structure other than the automobile body.

It is therefore an object of the present invention to provide a suspension system for a lightweight automobile that incorporates a relatively simple design. Another object of the present invention is to provide a suspension system for a lightweight automobile that is effective in stabilizing the automobile. Still another object of the present invention is to provide a suspension system for a lightweight automobile in which shock absorbers are not connected directly to the body of the automobile. Yet another object of the present invention is to provide a suspension system for a lightweight automobile that is easy to use and cost-effective to manufacture.

SUMMARY OF THE INVENTION

A suspension system for an automobile which includes a rear wheel and a plastic body attached to a steel frame includes a suspension arm coupled to the wheel. The suspension system further includes an elongated shock absorber having a rear end connected to the suspension arm and a front end connected to the frame, with the shock absorber being oriented substantially horizontally. Moreover, the shock absorber is oriented substantially fore-and-aft with respect to the vehicle.

In a preferred embodiment, the suspension arm has a forward end connected to the shock absorber and a rear end connected to the wheel. In this embodiment, the suspension system includes a rigid hollow frame beam connected to the frame and a resilient cartridge disposed in the frame beam. An arm shaft is connected to the suspension arm, preferably by splining, near the shock absorber and distanced from the rear end of the suspension arm. Additionally, this arm shaft is embedded in the resilient cartridge and is engaged therewith to attenuate rotational motion of the arm shaft relative to the cartridge. Preferably, the resilient cartridge is press fit into the frame beam, and the arm shaft is bonded to the resilient cartridge by vulcanization.

In another aspect of the present invention, an apparatus includes an automobile having a plastic molded body, a rear wheel, and a frame. A suspension system couples the rear wheel to the frame. In accordance with the present invention, the suspension system includes a substantially horizontally disposed shock absorber coupled to the rear wheel and connected directly to the frame.

In yet another aspect of the present invention, a method of coupling a frame of an automobile to a rear wheel of the automobile includes coupling a rear end of a shock absorber to the rear wheel. As disclosed in detail below, the shock absorber is oriented substantially horizontally and directly attached to the frame.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of an automobile incorporating the novel suspension system of the present invention, with the frame shown in phantom;

FIG. 2 is an exploded perspective view of the plastic body and steel frame, with the suspension system removed for clarity;

DETAILED DESCRIPTION OF THE PREFERRED EMBODIMENT

Figure 3:
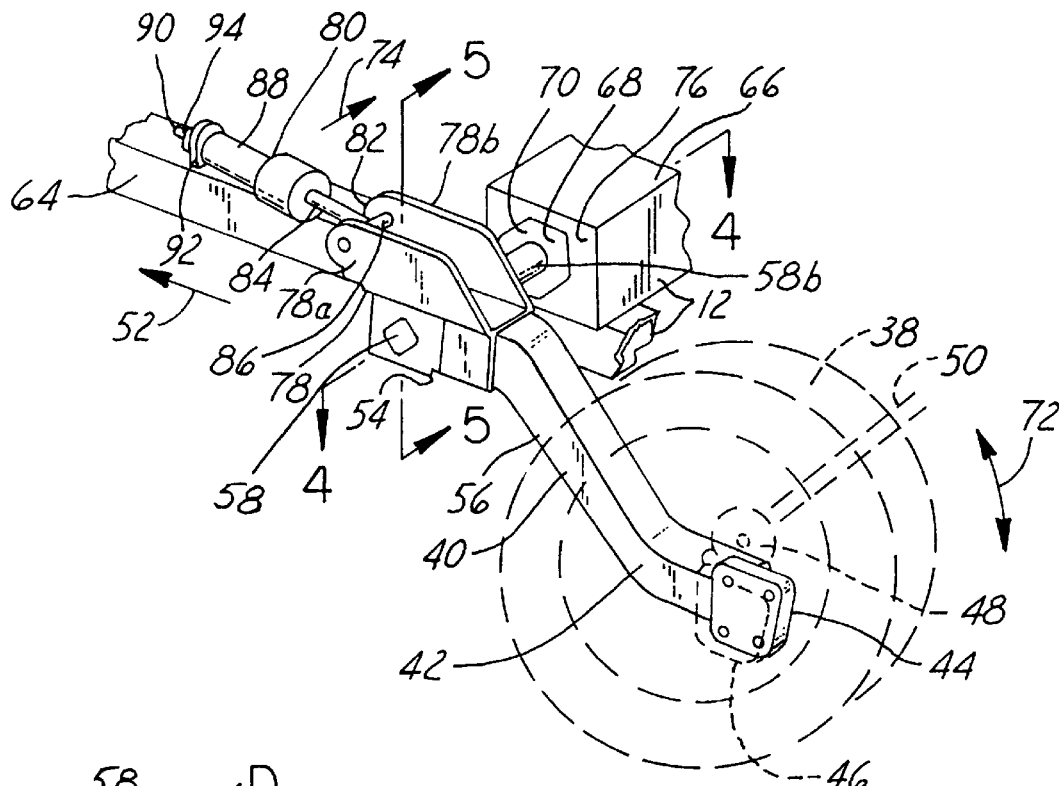
FIG. 3 is a perspective view of the left side components of the suspension system of the present invention in engagement with the frame, with portions broken away for clarity.

Referring initially to FIGS. 1 and 2, an automobile body 10 is shown attached to a steel automobile frame 12 for inclusion in an automobile, generally designated 100, having a motor 102 operably engaged therewith. Preferably, the automobile body 10 is made of a plastic composite material by injection molding. In a particularly preferred embodiment, the automobile body 10 is made of fiberglass-reinforced polyethylene (PET) plastic, such as the material that is available from Hoechst-Celanese under the trade name Celstran PET-15 having 15% fiberglass by weight.

As fully disclosed in the above-referenced U.S. patent application Ser. No. 08/540,297 and shown best in FIG. 2, in the presently preferred embodiment the body 10 is made of four molded pieces. Specifically, the body 10 is made of unitarily molded inner left and right panels 14, 16 which are bonded together. Also, the body 10 is made of unitarily molded outer left and right panels 18, 20 which are bonded to their respective inner panels 14, 16. As intended by the present invention, the inner and outer left panels 14, 18 establish a relatively stiff molded left shell, while the inner and outer right panels 16, 20 establish a relatively stiff molded right shell.

Each of the outer panels 18, 20 is formed with a respective lower engagement lip 22, 24, and as more fully disclosed below each lip 22, 24 is adhesively bonded to the frame 12. In addition to bonding the body 10 to the frame 12, the adhesive also reduces the transmission of unwanted noise from the frame 12 to the body 10. Additionally, a plurality of, preferably six, steel anti-peeling bolts 26a,b, 28a,b, 30a,b hold the body 10 next to the frame 12 by engaging respective threaded receptacles 32–36 in the frame 12 to prevent the body 10 from peeling away from the frame 12.

While FIG. 2 shows a four-piece body 10, it is to be understood that the present invention may be incorporated in automobiles having plastic bodies configured differently from the body 10.

Now referring to FIG. 3, a left rear wheel 38 of the automobile 100 is shown for reference in cooperation with the frame 12. An elongated rigid steel suspension arm 40 is coupled 10 to the wheel 38 and to the frame 12, as more fully disclosed below. It is to be understood that a suspension arm (not shown) which in all essential respects is identical to the suspension arm 40 shown in FIG. 3 couples the right rear wheel of the automobile 100 to the frame 12.

In the specific embodiment shown, the suspension arm 40 has a rear end segment 42 formed integrally with or welded to a generally flat, generally parallelepiped-shaped arm bracket 44, and the arm bracket 44 is bolted to a complementarily-configured wheel bracket 46 (shown in phantom). In turn, the wheel bracket 46 depends downwardly from and is fixedly attached to or formed integrally with a wheel hub 48 (also shown in phantom) which circumscribes a rear axle 50 of the automobile 100. It is to be understood that wheel hub 48 does not rotate with the wheel 38. Rather, the wheel hub 48 is engaged with a spindle (not shown) by means well-known in the automotive art, to prevent rotational motion of the hub 48.

As shown, the suspension arm 40 is elongated, and extends longitudinally forward relative to the automobile 100 (i.e., in the direction indicated by the arrow 52) to terminate in a front end segment 54. As shown, the suspension arm 40 may not be configured as a straight parallelepiped-shaped bar, but may instead be configured with a slight upward bend segment 56 if necessary to avoid interference with other components of the automobile 100.

Nevertheless, it is to be understood that the suspension arm of the present invention, in an elemental embodiment, is a rigid, elongate, longitudinally-disposed suspension arm, apart from incidental configurations which may be necessary, depending on the model of the automobile 100, to clear interference with other automotive components. Thus, as intended by the present invention, the suspension arm 40 is different than current suspension springs, which have material resiliency so they can flex under load. In contrast, the suspension arm 40 substantially does not flex.

FIG. 3 shows that a solid steel suspension arm shaft 58 is fixedly engaged with the suspension arm 40 in a perpendicular relationship therewith. Stated differently, the shaft 58 is connected to the suspension arm 40 and extends transversely away therefrom.

To engage the shaft 58 with the arm 40, an arm segment 58a of the shaft 58 is splined, i.e., the arm segment 58a is not round. In cross-reference to FIGS. 3, 4, and 5, the arm segment 58a is somewhat rectangular-shaped in transverse (with respect to the shaft 58) cross-section, with the vertices of the square being gently rounded, although other spline configurations may be used. In any case, the suspension arm 40 is formed with a receptacle cavity 60 (best shown in FIG. 5) that is configured for closely receiving the splined arm segment 58a of the arm shaft 58 therein. Additionally, a pinch bolt 62 may be threadably engaged with the suspension arm 40 and rotated to urge tightly against the arm segment 58a, to further engage the arm segment 58a with the suspension arm 40.

Referring back to FIGS. 3 and 4, the frame 12 includes a rigid steel longitudinal beam 64 and a rigid hollow steel transverse beam 66. As can be appreciated in reference to FIG. 3, the beams 64, 66 of the frame 12 are fixedly coupled together, e.g., by welding the beams together.

An elongated resilient rubber cartridge 68 is press-fit into the transverse beam 66. In accordance with the present invention, the cartridge 68 establishes a resilient non-metallic torque absorbing member. In one presently preferred embodiment, the cartridge 68 is made of a type ASTM specification M4AA624A13B13F17Z1 natural rubber made by Goodyear Tire Co.

In the embodiment shown, the cartridge 68 is hexagonally-shaped in transverse (with respect to the cartridge 68) cross-section. Accordingly, the transverse beam 66 is formed with a hexagonally-shaped channel 70 for closely receiving the cartridge 68 therein, while the outer surface of the transverse beam 66 is square. If desired, the outer surface of the transverse beam 66 can also be hexagonally-shaped. It is to be understood, however, that cartridge shapes other than hexagonal may be used.

Figure 4:
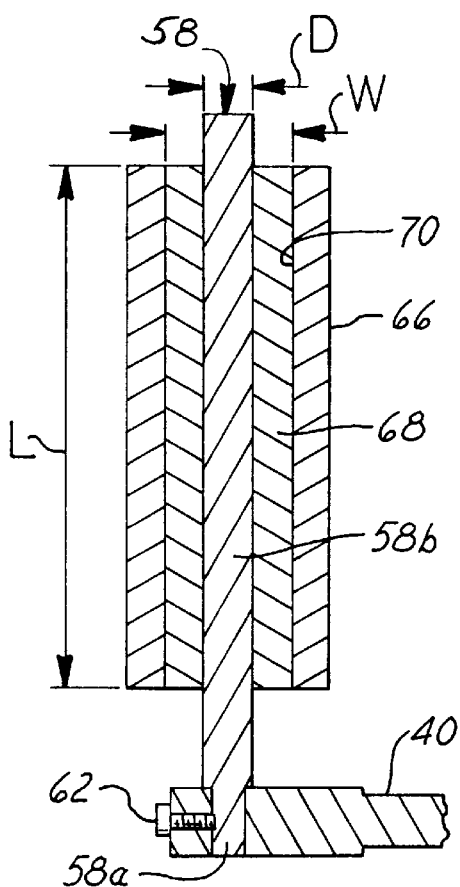
FIG. 4 is a cross-sectional view as seen along the line 4—4 in FIG. 3.
Figure 5:
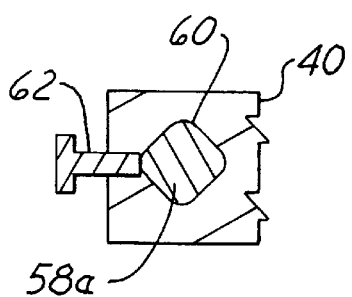
FIG. 5 is a cross-sectional view as seen along the line 5—5 in FIG. 3.

FIG. 4 shows the dimensions of the cartridge 68. As shown, the cartridge 68 has a length "L" of about fourteen inches (14"). Also, the distance "W" between opposing faces of the cartridge 68 is about three and a half inches (3.5").

As shown in FIGS. 3 and 4, a solid cylindrical cartridge segment 58b of the arm shaft 58 is embedded in and extends centrally through the cartridge 68. Effectively, the cartridge segment 58b pivotably engages the suspension arm 40 with the cartridge 68. To tightly bond the cartridge segment 58b to the cartridge 68, the cartridge segment 58b is vulcanized to the cartridge 68. In the presently preferred embodiment, the cartridge segment 58b has a diameter "D" of about one and a half inches (1.5").

With the above disclosure in mind, it may now be appreciated that relative rotational motion between the arm shaft 58 and cartridge 68 is substantially prevented. It may be further appreciated that when the wheel 38 moves up-and-down relative to the automobile 100 (i.e., in the directions indicated by the arrow 72), as typically occurs during driving, this motion is transferred via the suspension arm 40 to the arm shaft 58. In turn, the cartridge segment 58b of the arm shaft 58 is urged to rotate, but owing to the vulcanized bond between the segment 58b and the resilient cartridge 68, and the material resiliency of the cartridge 68, rotational motion of the arm shaft 58 (and, hence, up-and-down motion of the suspension arm 40 and wheel 38) is attenuated.

If desired, lateral movement of the suspension arm 40 (i.e., in the direction indicated by the arrow 74) can be limited by a mechanical stop. In the embodiment shown in FIG. 3, a left end face 76 establishes such a mechanical stop, to limit inboard lateral movement of the suspension arm 40. Other structure may be used, however, to perform the same function, depending on the particular configuration of the frame 12. For example, a metallic stop (not shown) may be welded to the frame 12 to limit lateral movement of the suspension arm 40. Outboard lateral movement of the suspension arm 40 can be similarly limited by a mechanical stop.

FIG. 3 best shows that a shock bracket 78 is formed integrally with or welded to the forward end segment 54 of the suspension arm 40. As shown, the shock bracket 78 preferably includes two bracket rails 78a, 78b.

An elongated, longitudinally-oriented (with respect to the automobile 100) pneumatic automotive shock absorber 80 has a rear mount 82 connected to the shock bracket 78 by means well-known in the art. In the specific embodiment shown, the rear mount 82 of the shock absorber 80 is established by a rod 84 of the shock absorber 80, and the rod 84 is engaged with a pin 86 which in turn is coupled to the rails 78a,b of the shock bracket 78 by means well-known in the art. In one presently preferred embodiment, the shock absorber 80 is a type X68565 Monroe shock absorber.

Additionally, a cylinder 88 of the shock absorber 80 establishes a front mount of the shock absorber 80 which is connected to the frame 12 by connection means well-known in the art such that the shock absorber 80 is mounted substantially horizontally on the automobile 100. In the embodiment shown, a threaded shaft 90 extends forwardly from the cylinder 88 and through a frame bracket 92 that is fixed, as by welding, to the longitudinal beam 64 of the frame 12. A nut 94 is engaged with the shaft 90 and is tightened against the frame bracket 92 to couple the shock absorber 80 to the frame 12.

Accordingly, as shown the shock absorber 80 of the present invention is not oriented substantially vertically relative the automobile 100, nor is the shock absorber 80 connected directly to the body 10 of the automobile 100, in contrast to conventional shock absorber arrangements. Instead, the shock absorber 80 is oriented substantially longitudinally and horizontally relative to the automobile 100, and is coupled to the rear wheel 38 by the suspension arm 40 and connected directly to the frame 12 vice the body 10. Consequently, the force loading of the shock absorber 80 is distributed to the frame 12, and stress to the plastic body 10 induced by the suspension system of the automobile 100 is thereby avoided. Moreover, interior space in the automobile 100 is maximized by the disclosed arrangement.

In the embodiment shown, the shock absorber 80 is canted slightly downwardly and inboard from its rear mount to its front mount to avoid interference with other components of the automobile 100. It is to be understood that other slight variations in the orientation of the shock absorber 80 may be effected to avoid interference. Nonetheless, the shock absorber 80 of the present invention is mounted substantially fore-and-aft relative to the automobile 100, and is connected to the frame 12.

While the particular HORIZONTALLY-MOUNTED REAR SHOCK ABSORBER FOR LIGHTWEIGHT MOTOR VEHICLE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. An automobile, comprising:

a rear wheel;

a steel frame including a rigid longitudinal beam and a rigid transverse beam interconnected to the longitudinal beam;

a body attached to the steel frame;

a suspension system for avoiding transfer of suspension loads to the body, the system interconnecting the rear wheel and the frame and including a suspension arm having a rear end segment provided with an arm bracket coupled to the wheel and having a front end segment provided with a shock bracket;

an elongated shock absorber having a rear end connected to the shock bracket provided on the suspension arm and a front end connected to the frame, the shock absorber being oriented substantially horizontally;

a rigid hollow frame beam connected to the frame;

a resilient cartridge disposed in the frame beam; and an arm shaft connected to the front end segment of the suspension arm and pivotally connecting the suspension arm within the frame beam, the arm shaft being embedded in the resilient cartridge and engaged therewith to substantially prevent relative motion therebetween to thereby attenuate rotational motion of the arm shaft relative to the cartridge.

2. The suspension system of claim 1, wherein the shock absorber is oriented substantially fore-and-aft with respect to the automobile.

3. The suspension system of claim 2, wherein the resilient cartridge is press fit into the frame beam, and the arm shaft is bonded to the resilient cartridge by vulcanization, the arm shaft extending through the cartridge.

4. An apparatus, comprising:

an automobile including a body, a rear wheel, and a frame;

a suspension system including a suspension arm coupling the rear wheel to the frame, the suspension system including a substantially horizontally disposed shock absorber coupled to the rear wheel and connected directly to the frame so as to avoid transfer of suspension loads to the plastic molded body;

a shock bracket provided on a front end segment of the suspension arm and connecting the shock absorber to the suspension arm;

an arm bracket provided on a rear end segment of the suspension arm and connecting the rear wheel to the suspension arm;

a rigid hollow transverse frame beam connected to the frame;

a resilient cartridge disposed in the frame beam; and an arm shaft connected to the front end segment of the suspension arm near the shock absorber and pivotally connecting the suspension arm within the transverse frame beam, the arm shaft being embedded in the resilient cartridge and engaged therewith to substantially prevent relative motion therebetween to thereby attenuate rotational motion of the arm shaft relative to the cartridge.

* * * * *